United States Patent Office 3,058,983
Patented Oct. 16, 1962

3,058,983
PREPARATION OF GLUTARIMIDE COMPOUNDS
Francis Johnson, West Newton, Mass., assignor to The Dow Chemical Company, Midland, Mich., a corporation of Delaware
No Drawing. Filed Feb. 1, 1960, Ser. No. 5,658
4 Claims. (Cl. 260—281)

This invention relates to a process for the preparation of 3-carboxymethylglutarimide from trimethyl α-cyanomethanetriacetate and to the preparation of related carboxymethylglutarimide compounds from related α-cyanomethanetriacetate compounds.

It is an object of this invention to provide a method of preparing glutarimide compounds from α-cyanomethanetriacetate compounds utilizing a procedure which makes it possible to obtain the desired glutarimide compound in a variety of substituted forms useful for the preparation of polymers, inter-polymers and the like, as well as in subsequent syntheses.

Since those glutarimide compounds have a heterocyclic ring with reactive oxygen groups and carboxyl groups appropriately oriented on the ring, the compounds represent an unusually valuable family for the purpose of providing synthetic bases for the synthesis of antibiotic type materials.

Other objects and advantages of the invention will in part be obvious and in part appear hereinafter.

The invention, accordingly, is embodied in a process for preparing carboxymethylglutarimide compounds starting with a cyanomethanetriacetate compound and reacting said compound with an alcohol and dry hydrogen chloride, or other hydrogen halide to form the imino ester hydrochloride, which, thereafter, upon heating, saponification, and decarboxylation is the 3-carboxymethylglutarimide compound. In the process, the cyanomethanetriacetate compound is hydrolyzed, cyclized and converted to the glutarimide desired. In general, it is possible to start the process of synthesis with a cyanomethaneacetic acid compound corresponding to the following general formula,

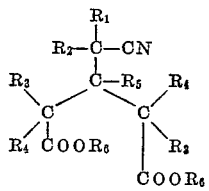

wherein the moieties $R_1$, $R_3$ may be low molecular weight alkyl or carboalkoxy groups; $R_2$, $R_4$, $R_5$, may be hydrogen or any low molecular weight alkyl group; $R_6$ is hydrogen or any salt or ester forming group. The starting materials may be characterized as any β-(cyanomethyl)glutaric acid compounds, such as the acids, salts, esters, etc.

By reaction of a starting material corresponding to this formula with any aliphatic alcohol in the presence of a hydrogen halide, preferably hydrogen chloride or hydrogen bromide, and carrying out the reaction in the initial stage at a low temperature preferably below 10° C., and as low as —70° C., and the extreme upper end of the range being about 50° C., then heating in the final stage within the range of 100–250° C., the glutarimide compound sought is obtained in good yield. The time of reaction and pressure are not critical. In the first stage of the reaction which involves an ester formation, a minimum of one equivalent of alcohol is required and the reaction can be carried out in the presence of an inert solvent.

The synthetic steps of the process and the details of operation will be better understood by reference to the following equations which summarize the operation:

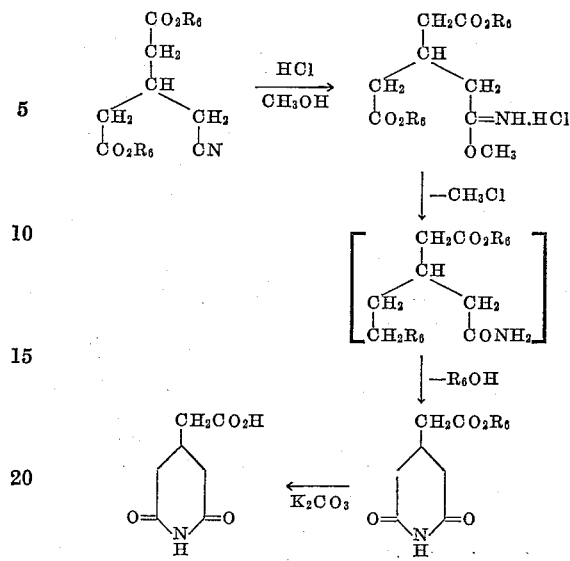

If in carrying out the process as outlined in the equations, which may be considered type equations to explain the mechanism of the reaction, there is an additional carboalkoxy group on the $R_1$, or $R_3$ position, this as a carboxyl group can be eliminated from the final product by heating to 180° C., with a trace of copper powder. That is, in the final stage, the material can be subjected to a potassium carbonate treatment summarized as follows:

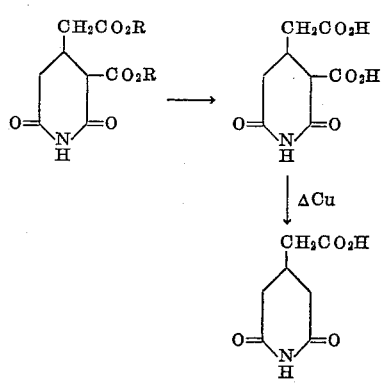

As a typical example of the synthesis carried out in accordance with this process, the following represents a detailed description of the method:

Trimethyl-α-cyanomethanetriacetate (12.5 parts) was dissolved in ether (150 parts by volume) containing methanol (6 parts) and the mixture cooled to —20° C. Dry hydrogen chloride was passed through the solution until it was saturated and the liquid then kept at —20° C. for two days, followed by one day at room temperature. The ether and excess methanol were removed under reduced pressure and the residue heated under reduced pressure to 120° C. for one hour until all effervescence ceased. This material was then stirred for sixteen hours with potassium carbonate (10 parts) in water (200 parts). The solution was then exactly neutralized, using 1 N hydrochloric acid, and the water removed under reduced pressure. The mixture of oil and solid thus obtained was extracted with acetone. The removal of the acetone from the extract gave a very viscous oil which was heated to 150° C. with a trace of copper powder until effervescence ceased. Crystallization of the glassy residue from ethylacetate gave a crop of crystals (4 parts) melting point 172.5° to 176.5° C. having an infrared spectrum identical with that of 3-carboxymethylglutarimide. A further recrystallization of this material from methanol ethyl acetate, a typical solvent, gave 3-carboxymethylglutarimide, with good recovery, of melting point 177°–179° C.

Similarly, other glutarimide compounds are prepared from starting materials corresponding to the general definition wherein substituents in the $R_{1-2-3}$, central carbon, and side-chain positions are varied. It appears that the substituents and side-chains are not altered by the conditions of the reaction and that, therefore, the ring closure with the compound going over to the imide form occurs efficiently and with good yield.

Typical β-(cyanomethyl)glutaric acid compounds useful for the process are diethyl-α-carbethoxy-β-cyanomethylglutarate,

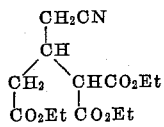

also, as an illustration of a more substituted compound,

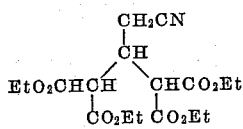

What is claimed is:

1. The method of preparing carboxymethylglutarimide compounds corresponding to the following:

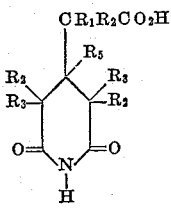

wherein the groups designated $R_1$, $R_2$, $R_3$ and $R_5$ are severally selected from the group consisting of H and lower alkyl and phenyl groups; the process comprising reacting a β-(cyanomethyl)glutaric acid compound as a starting material with a lower alkyl alcohol in an inert solvent, treating the mixture at a temperature below 50° C. with dry hydrogen halide, thereafter, warming said mixture thus saturated with hydrogen halide, to approximately room temperature for a period up to 24 hours, heating the resultant halide salt under reduced pressure for a period of time sufficient to cause all effervescence to cease, thereafter, reacting said product with an alkali metal carbonate to form the alkali metal carboxylate compound, acidifying and heating to effect decarboxylation, to form the free acid consisting essentially of a 3-carboxymethylglutarimide substituted in positions corresponding to the starting material.

2. The method in accordance with claim 1 wherein the starting material is trimethyl-α-cyanomethanetriacetate.

3. The method in accordance with claim 1 in which the starting material is diethyl α-carbethoxy-β-cyanomethyl-glutarate.

4. The method in accordance with claim 1 in which the starting material is

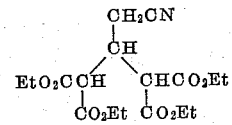

References Cited in the file of this patent
FOREIGN PATENTS
206,073     Australia _____ Mar. 3, 1955

OTHER REFERENCES

Bergmann: "The Chemistry of Acetylene and Related Compounds," page 80 (1948).